United States Patent
Ueyama et al.

(10) Patent No.: US 6,592,975 B1
(45) Date of Patent: Jul. 15, 2003

(54) LAMINATED PACKAGING MATERIAL AND PROCESS FOR PRODUCING THE SAME

(75) Inventors: Takahisa Ueyama, Tamari-mura (JP); Tadayoshi Itoh, Chiyoda-machi (JP); Hisanori Tobita, Tamari-mura (JP)

(73) Assignee: Kureha Chemical Industry Co., Ltd., Ibaraki (JP)

( * ) Notice: Subject to any disclaimer, the term of this patent is extended or adjusted under 35 U.S.C. 154(b) by 0 days.

(21) Appl. No.: 09/582,178
(22) PCT Filed: Dec. 25, 1998
(86) PCT No.: PCT/JP98/05956
§ 371 (c)(1), (2), (4) Date: Jun. 22, 2000
(87) PCT Pub. No.: WO99/33657
PCT Pub. Date: Jul. 8, 1999

(30) Foreign Application Priority Data

Dec. 29, 1997 (JP) ............................................ 9-368247

(51) Int. Cl.$^7$ ................................................. B32B 7/02
(52) U.S. Cl. ........................ 428/212; 428/500; 428/518; 428/913
(58) Field of Search ................................ 428/195, 212, 428/500, 518, 913

(56) References Cited

U.S. PATENT DOCUMENTS

| 5,232,767 A | * | 8/1993 | Hisazumi et al. | ........... 428/213 |
| 5,264,277 A | | 11/1993 | Frognet et al. | |
| 5,840,419 A | | 11/1998 | Alder | |
| 6,146,726 A | * | 11/2000 | Yoshii et al. | .............. 428/35.9 |

FOREIGN PATENT DOCUMENTS

| EP | 0756931 | 2/1997 |
| JP | 6-928 | 1/1994 |
| JP | 9-314772 | 12/1997 |

* cited by examiner

Primary Examiner—Cynthia H. Kelly
Assistant Examiner—B. Shewareged
(74) Attorney, Agent, or Firm—Dinsmore & Shohl LLP

(57) ABSTRACT

A laminated packaging material which comprises at least three layers of polymer materials comprising a surface layer, one or more intermediate layers adjacent thereto, and another surface layer, characterized in that the intermediate layer adjacent to each surface layer contains a lubricant, at least one of the intermediate layers has gas-barrier properties, and the total amount of a lubricant in the two surface layers is smaller than that in the intermediate layer(s) adjacent thereto. In production of the packaging material, adhesion of a lubricant to a die lip is reduced. The laminated packaging material has excellent transparency and gloss.

16 Claims, No Drawings

LAMINATED PACKAGING MATERIAL AND PROCESS FOR PRODUCING THE SAME

TECHNICAL FIELD

The present invention relates to a laminated packaging material, and more particularly to a laminated packaging material which comprises at least three layers of polymer materials comprising a surface layer, one or more intermediate layers adjacent thereto, and another surface layer and which has excellent transparency, gloss, slidability, and extrudability; and to a process for producing the packaging material. The laminated packaging material of the present invention is suitable for use as a packaging film for foods.

BACKGROUND ART

When a film or sheet is to be set in a packaging machine, slidability of the film or sheet is considered an important property. Conventionally, there is a method for improving operation efficiency or machine adaptability of a production apparatus of film or sheet, a bag-producing machine, or a packaging machine; i.e., a method for improving slidability between films or between sheets and slidability between a film or sheet and the apparatus or the machine, in which starch powder or a similar substance is sprinkled on the surface of the film or sheet. There is another method for improving such slidability, in which an organic lubricant such as fatty acid amide or an inorganic lubricant such as silica is incorporated into a surface layer of such a film or sheet, and this method is used widely.

These methods involve problems in terms of performance of the film produced and the film production process. Specifically, when a film is wound up in a roll after a large amount of powder is sprinkled onto the film, the powder may form irregularities on the surface layer of the film, resulting in deteriorated transparency and poor gloss of the film. In addition, in a film roll, there arises a difference in transparency and gloss between the core portion and the outermost portion. Therefore, there has been keen demand among persons skilled in the art for a method in which a small amount of powder is sprinkled onto a film.

When an organic or inorganic lubricant is incorporated into a surface layer of a film or sheet, the organic or inorganic lubricant adheres to a die lip portion during the production process which takes a long time. As a result, the adhering lubricant may scratch the surface layer of the film or sheet, causing poor transparency and gloss of the film or sheet. In order to prevent such a problem, the die lip portion must be cleaned at predetermined points in time; i.e., film or sheet production must be stopped temporarily, which reduces extrudability. Incidentally, when an inorganic lubricant such as organic glass or feldspar is incorporated into a surface layer of a film, the irregularities attributed to the inorganic lubricant may form on the surface of the film, and thus the film tends to have poor transparency and gloss.

DISCLOSURE OF THE INVENTION

In view of the foregoing, an object of the present invention is to provide a laminated packaging material which exhibits excellent transparency, gloss, productivity, and extrudability, a surface layer thereof having excellent slidability, and a process for producing the packaging material.

In order to solve the aforementioned conventional technical problems, the present inventors have performed extensive studies and have found that, in the case of production of a laminated packaging material, when the amount of a lubricant contained in a surface layer of the material is smaller than that contained in an intermediate layer adjacent to the surface layer, adhesion of the lubricant to a die lip is reduced during extrusion of the material, and that when the lubricant bleeds out from the intermediate layer into the surface layer with passage of time, slidability is imparted to the surface layer, and thus the amount of starch powder which is sprinkled onto the surface layer can be reduced. As a result, the present inventors have confirmed that slidability of the surface layer and extrudability of the packaging material can be improved while transparency, gloss, and productivity of the material are maintained. The present invention has been accomplished on the basis of these findings.

According to a first aspect of the present invention, there is provided a laminated packaging material which comprises at least three layers of polymer materials comprising a surface layer, one or more intermediate layers adjacent thereto, and another surface layer, characterized in that the intermediate layer adjacent to each surface layer without an adhesive layer therebetween contains a lubricant, at least one of the intermediate layers has gas-barrier properties, and the total amount of a lubricant contained in both surface layers is smaller than that contained in the intermediate layer(s) adjacent thereto without adhesive layer(s) therebetween.

According to a second aspect of the present invention, there is provided a laminated packaging material which comprises at least three layers of polymer materials comprising a surface layer, one or more intermediate layers adjacent thereto, and another surface layer, characterized in that the intermediate layer adjacent to each surface layer without an adhesive layer therebetween contains a lubricant and at least one of the surface layers is formed of polyethylene which is produced by use of a metallocene catalyst (hereinafter the polyethylene may be referred to as "metallocene catalyst polyethylene"). According to a third aspect of the present invention, there is provided a process for producing a laminated packaging material which comprises at least four layers of polymer materials comprising a surface layer, one or more intermediate layers adjacent thereto, an intermediate layer having gas-barrier properties, and another surface layer, characterized in that a lubricant is incorporated into the intermediate layer adjacent to each surface layer without adhesive layer(s) therebetween and no lubricant is incorporated into either of the surface layers, or the total amount of a lubricant contained in the two surface layers is determined such that the total amount is smaller than that contained in the intermediate layers adjacent to the respective surface layers.

BEST MODE FOR CARRYING OUT THE INVENTION

The present invention provides a laminated packaging material which comprises at least three layers comprising a surface layer, one or more intermediate layers containing a lubricant adjacent to the surface layer, and another surface layer.

As used herein, the term "a laminated packaging material" refers to a laminated packaging material which predominantly comprises polymer materials, particularly a multilayer film or sheet formed of thermoplastic resin, the packaging material being employed singly, both surface layers being employed by affixing together for use, the packaging material being employed by affixing to other films, sheets or paper materials, the packaging material being formed into bags or pouches, or the packaging material being formed into a container such as a tray so as to enhance the gas-barrier or water vapor barrier properties of the container.

As used herein, the term "surface layer" refers to each of the outermost layers which are surface layers of the laminated packaging material of the present invention. The two surface layers may be formed of the same resin or different resins. When both surface layers are affixed together to form a bag, one of the surface layers serves as a sealing layer. When the laminated packaging material of the present invention is shaped into an envelope form, one surface layer overlaps the other surface layer and are sealed for use.

As used herein, the term "intermediate layer which is adjacent to a surface layer and contains a lubricant" refers to an intermediate layer adjacent to a surface layer without an adhesive layer. The laminated packaging material may comprise a plurality of intermediate layers.

When the laminated packaging material comprises a plurality of intermediate layers, at least one intermediate layer adjacent to a surface layer contains a lubricant. An intermediate layer may be employed for obtaining the stretch orientation of a surface layer, and thus the surface layer and the intermediate layer are usually formed of different resins. In the first aspect of the present invention, an intermediate layer which provides easy stretch orientation and at least one intermediate layer having gas-barrier properties are employed. If necessary, a resin layer exhibiting excellent heat resistance or low-temperature strength, or a resin layer reinforcing all the layers may be provided simultaneously with the aforementioned intermediate layers.

In the second aspect of the present invention, the aforementioned intermediate layers may be provided singly or in combination. When adhesion between layers would otherwise be insufficient, an adhesive layer may be provided if necessary.

A lubricant which is employed in the present invention is one of a number of very important additives employed in a plastic product. Actually, for example, hydrocarbon lubricants, fatty acid lubricants, fatty acid amide lubricants, ester lubricants, or metallic soaps are employed in order to reduce friction between a film and the surface of a machine, such as a bag-producing machine or packaging machine.

Specifically, examples of hydrocarbon lubricants include liquid paraffin, natural paraffin, polyethylene wax, and microwax.

Examples of fatty acid lubricants include stearic acid and lauric acid. Examples of fatty acid amide lubricants include stearic acid amide, palmitic acid amide, N-oleylpalmitic acid amide, behenic acid amide, erucic acid amide, arachidinic acid amide, oleic acid amide, erucinic acid amide, methylenebisstearamide, and ethylenebisstearamide.

Examples of ester lubricants include butyl stearate, hydrogenated castor oil, ethylene glycol monostearate, and stearic acid monoglyceride.

Metallic soaps are derived from C12–C30 fatty acids, and typical examples of metallic soaps include zinc stearate and calcium stearate.

Of these lubricants, fatty acid amide lubricants and metallic soaps are preferably employed, in consideration of compatibility with polyolefin resin.

In addition, an antistatic agent may be employed in combination with a lubricant. In accordance with needs, an antistatic agent may be incorporated in order to suppress electrostatic hazards. Examples of electrostatic hazards include danger to humans due to sparks; reduction in mechanical adaptability in bag production due to adhesion of a product to a roll; and reduction in operation efficiency during removal of a sheet of a product due to adhesion between sheets. A surfactant preferably serves as an antistatic agent. Examples of surfactants which may be employed include anionic surfactants, cationic surfactants, nonionic surfactants, amphoteric surfactants, and a mixture thereof. An antistatic agent is incorporated into a layer in an amount of preferably 0.05–2 wt. % on the basis of the entirety of the resin in the layer, more preferably 0.1–1 wt. %.

The amount of a lubricant which is incorporated into an intermediate layer adjacent to a surface layer varies with the species of resin which serves as the intermediate layer and with the thickness ratio of the surface layer to the intermediate layer. The amount is preferably 0.05–5 wt. %, more preferably 0.1–2 wt. %. When the amount of a lubricant is small, the lubricant is incorporated in the form of a master batch. For example, when a lubricant is incorporated into an intermediate layer in an amount of 2 wt. %, a master batch containing the lubricant in an amount of 20 wt. % may be prepared in advance, and the master batch may be incorporated in an amount of 10 wt. % into the resin which serves as the intermediate layer.

The total amount of a lubricant which is incorporated into a resin constituting each of the surface layers must be smaller than that incorporated into a resin constituting an intermediate layer adjacent to a surface layer.

In production of the laminated packaging material of the present invention, preferably when no lubricant is incorporated into a resin constituting a surface layer adjacent to an intermediate layer containing a lubricant, adhesion of the lubricant to a die lip during extrusion can be prevented. In this case, the lubricant bleeds out from the intermediate layer into the surface layer of the laminated packaging material serving as a product, and the slidability of the surface layer can be maintained. The rate of transfer of the lubricant from the intermediate layer into the surface layer depends on the species of resins constituting the intermediate and surface layers, the thicknesses of these layers, and air temperature, such as room temperature during summer (approximately 25° C.) or room temperature during winter (approximately 15° C.). Usually, the lubricant is transferred into the surface layer 7–14 days after completion of production, and the surface layer can exhibit excellent slidability.

Examples of polymer materials which may be employed in the laminated packaging material of the present invention include polyolefins which are polymerized by use of a single-site catalyst; i.e., a metallocene catalyst (hereinafter such a catalyst will be abbreviated as "SSC"). Specific examples include linear high-density polyethylene (hereinafter abbreviated as "SSC-LHDPE"), linear middle-density polyethylene (hereinafter abbreviated as "SSC-LMDPE"), linear low-density polyethylene (hereinafter abbreviated as "SSC-LLDPE"), very-low-density polyethylene (hereinafter abbreviated as "SSC-VLDPE"), conventional ethylene.α-olefin copolymers (e.g., LHDPE, LMDPE, LLDPE, and VLDPE), ethylene.vinyl acetate copolymers (EVA), ethylene.methacrylic acid copolymers (EMAA), ethylene.methacrylic acid.unsaturated aliphatic carboxylic acid copolymers, high-density polyethylene, low-density polyethylene (LDPE), ionomer resins (IO), ethylene.acrylic acid copolymers (EAA), ethylene.methyl acrylate copolymers (EMA), ethylene.ethyl acrylate copolymers (EEA), modified polyolefin resins (for example, products obtained through reaction between olefin homopolymers or olefin copolymers and unsaturated carboxylic acids such as maleic acid and fumaric acid, acid anhydrides, esters, or metallic salts). When the laminated packaging material requires heat resistance, any of the thermoplastic resins such as polypropylene resins, polyester resins, aliphatic Nylons, and aromatic Nylons may be employed.

Of these polymer materials, SSC-LLDPE, SSC-VLDPE, LLDPE, VLDPE, EVA, EMAA, ethylene.methacrylic acid.unsaturated aliphatic carboxylic acid copolymers, ethylene.acrylic acid copolymers, and ionomer resins are often employed in a surface layer containing a seal layer. Among SSC polyolefins, particularly effective are ethylene.α-olefin copolymers which are produced by use of a constrained geometry catalyst. The catalyst is a form of single-site catalyst; i.e., metallocene catalysts developed by Dow Chemical Company. An ethylene.α-olefin copolymer which is produced by use of the constrained geometry catalyst is a substantially linear polyethylene resin. In the copolymer, the number of long chain branching on the basis of 1000 carbon atoms is approximately 0.01–3, preferably approximately 0.01–1, more preferably approximately 0.05–1. In the ethylene.α-olefin copolymer, a long chain comprising approximately six carbons or more is selectively branched in the molecular structure, and thus the copolymer has excellent physical properties and processability. The copolymer (product name: ™Affinity, ™Elite) is available from Dow Chemical Company.

In a laminated film of the present invention, in the case in which at least one surface layer is metallocene catalyst polyethylene, when an intermediate layer adjacent to the surface layer contains a lubricant, the features of the present invention are effectively exhibited (the intermediate layer refers to an intermediate layer which is adjacent to the surface layer as described above when the laminated film comprises a plurality of intermediate layers). Metallocene-type polyethylene contains a low-molecular-weight oligomer component in small amounts as compared with polyethylene produced by use of a conventional catalyst. Therefore, it is confirmed that a film produced from the metallocene-type polyethylene has little stickiness and provides excellent slidability. In the case in which the film is provided as a surface layer of the laminated film of the present invention, when no lubricant is incorporated into the metallocene-type polyethylene serving as the surface layer and a lubricant is incorporated into an intermediate layer adjacent to the surface layer, there can be obtained a laminated packaging material which has transparency and gloss of film and exhibits excellent slidability and extrudability of film.

A linear ethylene.α-olefin copolymer produced by use of a constrained geometry catalyst contains long chain branching in its molecule. Melt-fractures rarely occur in the copolymer over a wide processing range (shear rate range) as compared with a polyethylene resin produced by use of another metallocene catalyst (for example, "EXACT" produced by Exxon). In the ethylene.α-olefin copolymer, melt viscosity largely depends on shear rate, and shear sensitivity is great at high shear rates. In addition, in the case of the ethylen.α-olefin copolymer, the load of the motor of an extruder rarely increases and the back pressure of resin is low, as compared with the case of another polyethylene resin produced by use of a conventional metallocene catalyst. The ethylene.α-olefin copolymer has high melt-strength, and provides excellent bubble stability during a bubble process carried out in the course of film production. In the metallocene catalyst polyolefin, the ratio of weight average molecular weight (Mw) to number average molecular weight (Mn); i.e., (Mw/Mn) (polydispersity), is usually less than 3, preferably 1.5–2.8, more preferably 1.9–2.2.

Examples of surface layers other than a seal layer include a copolymerized polyester resin (Co-PET) having an IV value of approximately 0.7–0.8, which resin contains isophthalic acid serving as a comonomer.

Examples of preferable resins serving as an intermediate layer include a copolymer of ethylene and at least one monomer containing an oxygen atom in its molecule. Specific examples of the copolymers include EVA, C1–C4 ethylene.alkyl acrylate (e.g., EMA, EEA), an ethylene.methacrylic acid copolymer (EMMA), an ethylene.methacrylic acid.unsaturated aliphatic carboxylic acid copolymer, EMAA, and an ionomer (IO). Particularly, EVA, C1–C4 ethylene.alkyl acrylate, and metallocene catalyst polyethylene having a density of less than 0.900 g/cm$^3$ are preferable, since excellent slidability is obtained even when a lubricant is incorporated in small amounts. In addition, these are preferable in consideration of stretch orientation for producing a thermal-shrinkable film.

In a plurality of intermediate layers, a layer having gas-barrier properties is formed of a resin which is used as an oxygen gas-barrier layer. The gas-barrier layer is preferably provided in the laminated packaging material so as to have an oxygen gas permeability of 150 cm$^3$/m$^2$·24 hours (temperature: 30° C., relative humidity: 80%) or less. Examples of such resins include known EVOH; aromatic polyamides containing aromatic diamine, such as polymethaxylylene adipamide (hereinafter abbreviated as "Nylon MXD6"); aromatic polyamides containing aromatic carlboxylic acid, such as polyhexamethylene isophthalamide/terephthalamide which is a copolymer of isophthalic acid, terephthalic acid, and hexamethylenediamine (hereinafter abbreviated as "Nylon 6I/6T"); vinylidene chloride copolymers (PVDC); and acrylonitrile copolymers (hereinafter abbreviated as "PAN"). Of these resins having gas-barrier properties, PVDC is preferable in consideration of low humidity-dependence of gas-barrier properties, and EVOH and Nylon MXD6 are preferable in consideration of co-extrudability. For example, when a lubricant is incorporated into a PVDC resin layer, the gas-barrier properties of the layer tend to deteriorate. As described above, preferably, a lubricant is incorporated into a surface layer in small amounts. According to the present invention, a lubricant is preferably incorporated into an intermediate layer adjacent to a surface layer. In a first aspect of the present invention, the preferable laminated packaging material comprises a resin layer having gas-barrier properties, which serves as an intermediate layer that differs from an intermediate layer adjacent to a surface layer. Therefore, even when a lubricant partially bleeds out from the intermediate layer adjacent to the surface layer into the resin layer having gas-barrier properties, the aforementioned effects of the present invention can be attained while minimizing reduction in gas-barrier properties, as compared with the case in which a lubricant is incorporated directly into the resin layer having gas-barrier properties.

In addition, when the laminated packaging material requires low-temperature strength or heat-resistance, a material exhibiting excellent low-temperature strength or heat-resistance may be appropriately provided in the packaging material as an intermediate layer. For example, the intermediate layer may be a polyamide (PA) layer. Examples of PAs include aliphatic polyamides such as Nylon-6 (polycapramide), Nylon-66 (polyhexamethylene adipamide), Nylon-610 (polyhexamethylene sebacamide), Nylon-12 (a ring-opening polymer of lauryllactam), Nylon- 6/66 (a copolymer of ε-caprolactam and hexamethylenediamine), Nylon-6/610 (a copolymer of ε-caprolactam and hexamethylene sebacamide), Nylon-6/12 (a copolymer of ε-caprolactam and lauryllactam), Nylon-6/66/610 (a copolymer of ε-caprolactam, hexamethylene adipamide, and hexamethylene sebacamide), and Nylon-6/66/12 (a copolymer of ε-caprolactam, hexamethylene adipamide, and lauryllactam). Of these, Nylon-6/66 and Nylon-6/12 are preferable, in consideration of shapability. These PAs may be employed singly or in combination of two or more species. In addition, examples of materials of the intermediate layer include a material predominantly containing such aliphatic polyamides in which aromatic polyamides are blended, and polyesters such as polyethylene terephthalate, polybutylene terephthalate, and Co-PET.

If necessary, powder may be sprinkled onto the laminated packaging material of the present invention, in order to enhance the slidability of the surface of the material. An example of such sprinkled powder is particle-size-regulated starch powder. The amount of powder which is sprinkled is preferably 90 mg/m$^2$ or less, in consideration of maintenance of the transparency of the laminated packaging material.

Typical examples of layer structures of the laminated packaging material of the present invention are as follows. Hereinafter polyolefin will be abbreviated as "PO."

(1) PO resin layer (surface layer)/PO resin layer (intermediate layer)/adhesive layer/resin layer having gas-barrier properties (intermediate layer)/adhesive layer/PO resin layer (surface layer)

(2) PO resin layer (surface layer)/PO resin layer (intermediate layer)/adhesive layer/resin layer having gas-barrier properties (intermediate layer)/adhesive layer/PO resin layer (intermediate layer)/PO resin layer (surface layer)

(3) SSC-PO resin layer (surface layer)/PO resin layer (intermediate layer)/SSC-PO resin layer (surface layer)

(4) SSC-PO resin layer (surface layer)/PO resin layer (intermediate layer)/adhesive layer (surface layer): laminated onto paper layer (substrate)

(5) SSC-PO resin layer (surface layer)/PO resin layer (intermediate layer)/adhesive layer/vapor-deposition layer (surface layer):laminated onto paper layer (substrate)

Particularly preferable examples of the aforementioned structures are as follows.

(6) SSC-VLDPE layer/EMAA layer/adhesive layer/PVDC layer/adhesive layer/EVA layer/SSC-VLDPE layer (7) SSC-VLDPE layer/EMAA layer/adhesive layer/PVDC layer/adhesive layer/EMAA layer/SSC-VLDPE layer (8) VLDPE layer/EMAA layer/adhesive layer/PVDC layer/adhesive layer/EMAA layer/VLDPE layer (9) SSC-VLDPE layer/EVA layer/adhesive layer/PVDC layer/adhesive layer/EVA layer/ionomer layer

(10) SSC-VLDPE layer/EMAA layer/adhesive layer/PVDC layer/adhesive layer/EVA layer/ionomer layer In these layer structures, the aforementioned lubricant may be incorporated into any of intermediate layers which are at least adjacent to surface layers. The lubricant may be incorporated into the surface layer such that the amount of the lubricant in the surface layer is smaller than that in the intermediate layer. Preferably, the lubricant is not incorporated into the surface layer.

If necessary, the aforementioned adhesive layer may be provided in the case in which adhesion between layers is insufficient. Known adhesive layers may be employed so as to meet the form of layer structure. Examples of adhesive layer resins which may be employed include EVA, EEA, EAA, acid-modified LLDPE, and known acid-modified polyolefins. Preferable examples include olefin resins which are modified by maleic acid or maleic anhydride, ionomer resins, EVA, and EEA. When EVA or EEA is employed in an adhesive layer, the thickness of the adhesive layer may be increased such that the adhesive layer also serves as an intermediate layer.

The thickness of the laminated packaging material (film or sheet) of the present invention is 5–300 μm, preferably 10–150 μm, more preferably 20–120 μm. When the thickness is less than 5 μm, adequate mechanical properties of the film or sheet cannot be obtained, whereas when the thickness is in excess of 300 μm, the transparency of the film or sheet tends to lower. A thermal-shrinkable film is oriented and the film has rigidity, and thus even when a lubricant is incorporated into the film in small amounts, the film exhibits sufficient slidability and maintains transparency and gloss.

In the film or sheet, an intermediate layer which is adjacent to a surface layer and contains a lubricant only or both a lubricant and an antistatic agent is preferably thicker than the surface layer. When the thickness ratio of the intermediate layer to the surface layer (the thickness of the intermediate layer/the thickness of the surface layer) is in excess of 10, large amounts of lubricant must be incorporated into the intermediate layer, and thus production cost may increase and the transparency of the film or sheet maybe lowered. In addition, the appearance of the film or sheet tends to be poor (i.e., longitudinal wrinkling may occur), since the laminated layer stagnates in a die. In contrast, when the ratio is less than one, the lubricant may insufficiently bleed out from the intermediate layer, or the film or sheet must be stored for a prolonged period of time for improving the slidability of the film or sheet even when the lubricant may bleed out sufficiently, which is industrially unsatisfactory. In addition, substantial effects of the antistatic agent may not be obtained.

In the present invention, when a layer having gas-barrier properties is provided as an intermediate layer, the thickness of the layer is, for example, 1–100 μm, preferably 3–50 μm. When the thickness is less than 1 μm, the layer has poor oxygen gas-barrier properties, whereas when the thickness is in excess of 100 μm, the extrudability of a film or sheet comprising the layer may deteriorate. In the present invention, the thickness of an adhesive layer is preferably 0.5–5 μm.

An example process for producing a laminated packaging material (film or sheet) of the present invention will next be described. In the case in which the laminated packaging material comprises four or more layers, a first surface layer, an intermediate layer adjacent thereto, one or more other intermediate layers, and a second surface layer are prepared. The amount of a lubricant which is incorporated into a resin constituting the first surface layer is reduced as compared with that of a lubricant which is incorporated into a resin constituting the intermediate layer adjacent to the first surface layer. Preferably, no lubricant is incorporated into the first layer resin. A film is produced by use of these layers through a plurality of extruders and a known circular die or T-die.

In the thus-produced laminated packaging material, at least one intermediate layer adjacent to the first surface layer contains a lubricant, and the lubricant bleeds out into the first surface layer and other layers with passage of time. A lubricant may be incorporated into a resin constituting the second surface layer, but preferably, no lubricant is incorporated into the second surface layer.

The aforementioned layers may be extruded separately in advance, and laminated by means of a dry-lamination method. Alternatively, the above-produced film or sheet may be affixed to a paper layer instead of to other resins or polymer materials through a known lamination method. In this case, the surface of the laminated packaging material is a layer which is formed during extrusion.

The film or sheet may or may not be stretched. In the case of production of a thermal-shrinkable multi-layer film, firstly a plurality of films are co-extruded by use of a plurality of extruders to thereby obtain an unstretched film, and then the resultant film is subjected to biaxial stretching through a known method such as a tenter method or an inflation method. The draw ratios of the film in longitudinal and lateral directions are preferably approximately 2 to 4. The thermal shrinkage percentages of the film in longitudinal and lateral directions at a desired thermal-shrinkage temperature is preferably 40% or more, more preferably 50% (80° C.)

The laminated packaging material may be irradiated by means of a known method, before or after stretching. The stretch orientation, heat-resistance, and mechanical strength of the irradiated laminated packaging material are improved as compared with those of the laminated packaging material which is not irradiated. Irradiation imparts appropriate cross-linking effects to the laminated packaging material, and thus the material exhibits excellent properties in terms of film formation by stretching, as well as heat-resistance. In the present invention, known radiation rays such as α-rays, β-rays, electron beams, γ-rays, and x-rays may be employed. Of these, electron beams and γ-rays are preferable, in consideration of cross-linking effects before or after irradiation. Particularly, electron beams are advantageously employed in consideration of handling and high processing performance during production of the laminated packaging material.

Irradiation conditions of the aforementioned radiation may be appropriately determined in accordance with the intended use of the laminated packaging material. For example, in the case of electron beams, the acceleration voltage is preferably 150–500 kilovolts (hereinafter abbreviated as "kV") and the exposure dose is preferably 10–200 kilograys (hereinafter abbreviated as "kGy"). In the case of γ-rays, the exposure dose rate is preferably 0.05–3 kGy/hour.

In the laminated packaging material of the present invention, at least, the kinetic friction coefficient of a surface layer falls within a range of 0.05 or more and less than 0.3, preferably 0.10 or more and less than 0.30, more preferably 0.13 or more and less than 0.25. When the kinetic friction coefficient is below the lower limit of the range, the mechanical adaptability of the material may deteriorate due to excessive sliding of the material, or handling efficiency of the material may be lowered during an actual packaging process. In contrast, when the kinetic friction coefficient is above the upper limit of the range, the mechanical adaptability of the material may deteriorate due to poor slidability of the material, and wrinkling may occur during secondary processing.

EXAMPLES

The present invention will next be described in more detail by way of examples, which should not be construed as limiting the invention thereto. Resin materials employed and methods for measuring physical properties in the present invention are as follows.

1. (Resin material employed)

(1) SSC-VLDPE

Affinity FW1650 produced by Dow Chemical Co. (density: 0.902 g/cm$^3$, MFR: 3.0 g/10 min, melting point: 100° C., hereinafter abbreviated as "SSC-VLDPE-1") was employed.

Affinity PL1840 produced by Dow Chemical Co. (density: 0.908 g/cm$^3$, MFR: 1.0 g/10 min, melting point: 111° C., hereinafter abbreviated as "SSC-VLDPE-2") was employed.

(2) VLDPE

Moretec V0398CN produced by Idemitsu Petrochemical Co., Ltd. (density: 0.907 g/cm$^3$, MFR: 3.3 g/10 min, melting point: 119° C., hereinafter abbreviated as "VLDPE-1") was employed.

(3) EMAA-IBA resin

Nucrel AN4217-1C produced by Mitsui.Dupont Polychemicals Co., Ltd. (a copolymer of ethylene.methacrylic acid.isobutyl acrylate, hereinafter abbreviated as "EMAA-IBA") (density: 0.94 g/cm$^3$, MFR: 2.4 g/10 min, melting point: 87° C.) was employed.

(4) Adhesive layer resin

EEA resin DPDJ-6182K produced by Nippon Unicar Co., Ltd. (density: 0.94 g/cm$^3$, MFR: 1.3 g/10 min, melting point: 96° C., ethyl acrylate content: 15 wt. %, hereinafter abbreviated as "EEA") was employed.

(5) PVDC

PVDC resin Krehalon FB-2 produced by Kureha Chemical Industry Co., Ltd. (vinylidene chloride content: 82 wt. %, vinyl chloride content: 18 wt. %) was employed.

(6) EVA

EVA resin EVAFLEX V-5715 produced by Mitsui.Dupont Polychemicals Co., Ltd. (density: 0.94 g/cm$^3$, MFR: 2.0 g/10 min, vinyl acetate content: 19 wt. %, hereinafter abbreviated as "EVA-1"), and EVA resin EVAFLEX V-5714 produced by Mitsui.Dupont Polychemicals Co., Ltd. (density: 0.94 g/cm$^3$, MFR: 2.5 g/10 min, vinyl acetate content: 15 wt. %, hereinafter abbreviated as "EVA-2") were employed.

(7) Ionomer

Himilan AM7930 produced by Mitsui.Dupont Polychemicals Co., Ltd. (density: 0.94 g/cm$^3$, MFR: 3.1 g/10 min, melting point: 90° C., Ionized percentage: 8%, hereinafter abbreviated as "IO-1") was employed.

2. (Melt flow rate (MFR))

The MFR of a sample was measured according to ASTM D1238. MFR was measured at 190° C. and a measurement load of 2.16. kg and by use of a melt indexer (product of Toyo Seiki Seisakusho).

3. (Adhesion of lubricant to die lip portion during production)

When a cylindrical film was produced through melt-bonding in a circular die, the condition of the die lip portion of the die was observed. The degree of adhesion of a lubricant to the die lip portion during the production process was determined as follows.

- ○: The lubricant adhered little to the die lip portion after eight hours' operation. Cleaning of the die lip was not necessary.
- Δ: The lubricant adhered to the die lip portion to some extent after eight hours' operation. Cleaning of the die lip was necessary.

X: The lubricant adhered to the die lip portion after one to four hours' operation, and scratches were formed on the surface of a film or sheet. Production was stopped every two to four hours, and cleaning of the die lip was necessary. The thus-produced film or sheet had poor appearance and deteriorated extrudability.

4. (Methods for measuring physical properties)

(1) Kinetic friction coefficient

The kinetic friction coefficient of a sample was measured in a machine direction according to JIS K-7125. A friction tester (TR-type) (product of Toyo Seiki Seisakusho) was employed for measurement. In measurement, metal was employed as a counter material. When the kinetic friction coefficient is high, the sample has poor slidability, whereas when the kinetic friction coefficient is low, the sample has excellent slidability.

(2) Glossiness (gloss)

The glossiness of a sample (gloss; %) was measured according to JIS Z-8741. A cloudiness meter (model: NDH-Σ80, product of Nihon Denshoku Kogyo) was employed for measurement. When the gloss value of the sample is high, the sample has excellent gloss, whereas when the gloss value is low, the sample has poor transparency.

(3) Transparency (haze)

The cloudiness of a sample (haze; %) was measured according to JIS K-7105. The incident angle and reflection angle of light were set at 60°. A cloudiness meter (model: NDH-Σ80, product of Nihon Denshoku Kogyo) was employed for measurement. When the haze value of the sample is low, the sample has excellent transparency, whereas when the haze value is high, the sample has poor transparency.

(4) Thermal-shrinkage percentage

Marks were provided on a sample of polymer material at a distance of 10 cm in a machine direction (longitudinal direction) and in a direction perpendicular to the machine direction (lateral direction). The sample was dipped into hot water of 80° C. for 10 seconds, and then cooled with non-heated water immediately after being removed from the hot water. Subsequently, in each of the above directions, the distance between the marks was measured. The measured distance was subtracted from 10 cm, and the ratio of the subtracted value to 10 cm was obtained and expressed as a percentage. Tests were performed five times per sample, and the mean value was regarded the thermal-shrinkage percentage.

5. Analysis of lubricant

A lubricant was analyzed through the following procedure.

A lubricant on the surface of a produced film was washed with methanol, and layers of the film were separated from one another at predetermined layer blocks. The methanol solution after washing was analyzed together with the below-described extract. When the layers of the film could be separated easily, the lubricant was removed from every layer. When the layers of the film were difficult to separate from one another, the film was cut to a predetermined depth by use of a microtome (Reichert-Nissei ULTRACUT N, product of Nissei Sangyo).

The thus-cut sample was crushed or finely cut, and the resultant sample (1–10 g) was subjected to extraction with an extraction solvent (100 ml) by use of a Soxhlet's extractor for six hours or more, for extraction of the lubricant. The solvent dissolves the lubricant but does not dissolve polymers constituting the film. The resultant extract and the above methanol washing solution were filtered together, and then the filtrate was concentrated through evaporation.

The extraction solvent may be chosen from among chloroform, diethyl ether, acetone, and n-hexane, but water or methanol must be employed for extraction of an ionic surfactant. The above-concentrated sample was subjected to high performance liquid chromatography or gas chromatography, and,the amount of the lubricant in the sample was determined by use of a calibration curve that had been prepared in advance by use of the same lubricant.

The qualitative analysis of the lubricant may be carried out by means of any of infrared spectrophotometry, nuclear magnetic resonance, Raman spectroscopy, and mass spectrometry.

6. (Secondary processability)

A produced laminated film was processed into a bag by means of a bag-producing machine (model: BM37, product of Kureha Chemical Industry Co., Ltd.). On the basis of the machine adaptability of the bag-producing machine, secondary processability of the film was determined as follows.

○: Produced bags were conveyed smoothly to the next step during eight hours' continuous operation, and no wrinkling occurred on the bag during the bag production process.

X: Produced bags were caught in the vicinity of a sealing portion of the bag-producing machine, and continuous operation was difficult.

Example 1

A vinylidene chloride.vinyl chloride copolymer (PVDC), linear very low density polyethylene (SSC-VLDPE-1), an ethylene.vinyl acetate copolymer (EVA-1) containing erucic acid amide (0.1 wt. %), an ethylene.vinyl acetate copolymer (EVA-2), ethylene.ethyl acrylate copolymer (EEA), and an ionomer resin (IO-1) were separately extruded through six extruders. These molten polymers were introduced into a co-extrusion circular die, successively melt-bound in the order of (SSC-VLDPE-1)/(EVA-1)/(EEA)/(PVDC)/(EEA)/(EVA-2)/(IO-1) from the outermost layer to the innermost layer, and co-extruded from the die, to thereby form a molten tube having seven layers. The temperature of the molten tube was 200° C. at the outlet of the die. The tube was cooled with a cold water shower at 10–20° C., to thereby form a flat tube having a width of 138 mm and a thickness of 558 $\mu$m. The thus-formed flat tube was subjected to electron-beam irradiation in an electron-beam irradiation apparatus at an acceleration voltage of 300 kV and an exposure dose of 80 kGy. The resultant tube was passed through a hot water bath of 82° C., and then biaxially stretched 3.1 times in a longitudinal direction and 3.0 times in a lateral direction simultaneously by means of an inflation method while the tube was cooled with air of 10° C. by use of an air ring. The resultant biaxially stretched tubular film had a folded width of 416 mm and a thickness of 60 $\mu$m. Particle-size-regulated starch powder (AS-100S, product of Nikka Co., Ltd.) (45 mg/m$^2$) was sprinkled onto the surface layer of the film in a winder of the film. The film was wound in a roll and stored at room temperature. Two weeks after production, the slidability, transparency, and gloss of the film were excellent. The results of evaluation of the film are shown in Table 1.

Example 2

The procedure of Example 1 was repeated, except that the amount of erucic acid amide contained in (EVA-1) of Example 1 was changed to 0.2 wt. %, and an antistatic agent (Resistat PE-139, product of Dai-Ichi Kogyo Seiyaku Co., Ltd., chemical name: stearic acid mono and diglyceride boric acid ester) (0.2 wt. %) was incorporated, to thereby produce a biaxially stretched film. Two weeks after production, the slidability, transparency, and gloss of the film were excellent. The results of evaluation of the film are shown in Table 1.

Example 3

The procedure of Example 1 was repeated, except that (EVA-1) of Example 1 was replaced by (EMAA-IBA) containing erucid acid amide (0.75 wt. %), to thereby produce a biaxially stretched film. Two weeks after production, the slidability, transparency, and gloss of the film were excellent. The results of evaluation of the film are shown in Table 1.

Example 4

The procedure of Example 3 was repeated, except that the amount of erucid acid amide contained in (EMAA-IBA) of Example 3 was changed to 1.0 wt. %, to thereby produce a biaxially stretched film. Two weeks after production, the slidability, transparency, and gloss of the film were excellent. The results of evaluation of the film are shown in Table 1.

Example 5

The procedure of Example 3 was repeated, except that (IO-1) of Example 3 was replaced by very low density polyethylene (VLDPE-1), and (EVA-2) of Example 3 was replaced by (EMAA-IBA) containing erucic acid amide (0.75 wt. %), to thereby produce a biaxially stretched film. Two weeks after production, the slidability, transparency, and gloss of the film were excellent. The results of evaluation of the film are shown in Table 1.

Example 6

The procedure of Example 1 was repeated, except that (SSC-VLDPE-1) of Example 1 was replaced by very low density polyethylene (SSC-VLDPE-2), to thereby produce a biaxially stretched film. Two weeks after production, the slidability, transparency, and gloss of the film were excellent. The results of evaluation of the film are shown in Table 2.

Example 7

The procedure of Example 1 was repeated, except that (SSC-VLDPE-1) of Example 1 was replaced by very low density polyethylene (VLDPE-1), to thereby produce a biaxially stretched film. Two weeks after production, the slidability, transparency, and gloss of the film were excellent. The results of evaluation of the film are shown in Table 2.

Example 8

The procedure of Example 1 was repeated, except that (EVA-1) of Example 1 was replaced by an ionomer resin (IO-1) containing N-oleylpalmitic acid amide (0.5 wt. %) and a mixture of arachidinic acid amide/behenic acid amide (0.25 wt. %), to thereby produce a biaxially stretched film. Two weeks after production, the slidability, transparency, and gloss of the film were excellent. The results of evaluation of the film are shown in Table 2.

Example 9

The procedure of Example 2 was repeated, except that erucic acid amide (0.05 wt. %) was incorporated into (SSC-VLDPE-1) of Example 2, to thereby produce a biaxially stretched film. Two weeks after production, the slidability, transparency, and gloss of the film were excellent. The results of evaluation of the film are shown in Table 2.

TABLE 1

| | | Example 1 | Example 2 | Example 3 | Example 4 | Example 5 |
|---|---|---|---|---|---|---|
| Layer Structure | 1st layer (3 μm) (1st surface layer) | SVL-1*[1] | SVL-1*[1] | SVL-1*[1] | SVL-1*[1] | SVL-1*[1] |
| | 2nd layer (22 μm) | EVA-1*[2] | EVA-1*[3] | EMAA1*[4] | EMAA2*[5] | EMAA1*[4] |
| | 3rd layer (1.5 μm) | EEA | EEA | EEA | EEA | EEA |
| | 4th layer (7 μm) | PVDC | PVDC | PVDC | PVDC | PVDC |
| | 5th layer (1.5 μm) | EEA | EEA | EEA | EEA | EEA |
| | 6th layer (15 μm) | EVA-2 | EVA-2 | EVA-2 | EVA-2 | EMAA1*[4] |
| | 7th layer (10 μm) (2nd surface layer) | IO-1 | IO-1 | IO-1 | IO-1 | VL-1*[6] |
| Amount of particle-size-regulated starch powder sprinkled onto the outer surface (mg/m$^2$) | | 45 | 45 | 45 | 45 | 45 |
| Amount of lubricant incorporated into 2nd layer (wt. %) | | 0.1 | 0.2 | 0.75 | 1.0 | 0.75 |
| Amount of lubricant incorporated into the surface layer (1st layer) (wt. %) | | 0 | 0 | 0 | 0 | 0 |
| Adhesion of lubricant to die lip portion | | ○ | ○ | ○ | ○ | ○ |
| Gloss (gloss %): roll surface layer portion MD/TD | | 128/126 | 129/127 | 133/130 | 133/129 | 129/126 |
| Thermal shrinkage percentage (MD/TD %) | | 52/53 | 51/52 | 50/51 | 51/52 | 44/43 |
| Transparency (haze %) | | 2.1 | 2.1 | 2.2 | 2.2 | 2.1 |
| Kinetic friction coefficient of 1st surface layer | | 0.20 | 0.18 | 0.19 | 0.16 | 0.20 |
| Secondary processability | | ○ | ○ | ○ | ○ | ○ |

SVL-1*[1]: SSC-VLDPE-1
EVA-1*[2]: EVA-1 containing erucic acid amide (0.1 wt. %)
EVA-1*[3]: EVA-1 containing erucic acid amide (0.2 wt. %)
EMAA1*[4]: EMAA-IBA containing erucic acid amide (0.75 wt. %)
EMAA2*[5]: EMAA-IBA containing erucic acid amide (1.0 wt. %)
VL-1*[6]: VLDPE-1

TABLE 2

|  |  | Example 6 | Example 7 | Example 8 | Example 9 |
|---|---|---|---|---|---|
| Layer Structure | 1st layer (3 μm) (1st surface layer) | SVL-2*[7] | VL-1*[6] | SVL-1*[1] | SVL-1*[9] |
|  | 2nd layer (22 μm) | EVA-1*[2] | EVA-1*[2] | IO-1*[8] | EVA-1*[3] |
|  | 3rd layer (1.5 μm) | EEA | EEA | EEA | EEA |
|  | 4th layer (7 μm) | PVDC | PVDC | PVDC | PVDC |
|  | 5th layer (1.5 μm) | EEA | EEA | EEA | EEA |
|  | 6th layer (15 μm) | EVA-2 | EVA-2 | EVA-2 | EVA-2 |
|  | 7th layer (10 μm) (2nd surface layer) | IO-1 | IO-1 | IO-1 | IO-1 |
| Amount of particle-size-regulated starch powder sprinkled onto the outer surface (mg/m$^2$) | | 45 | 45 | 45 | 45 |
| Amount of lubricant incorporated into 2nd layer (wt. %) | | 0.1 | 0.1 | 0.75 | 0.2 |
| Amount of lubricant incorporated into the surface layer (wt. %) | | 0 | 0 | 0 | 0.05 |
| Adhesion of lubricant to die lip portion | | ○ | ○ | ○ | Δ |
| Gloss (gloss %): roll surface layer portion MD/TD | | 133/126 | 127/127 | 129/124 | 126/127 |
| Thermal shrinkage percentage (MD/TD %) | | 50/52 | 51/52 | 52/54 | 51/52 |
| Transparency (haze %) | | 2.5 | 2.8 | 2.9 | 2.7 |
| Kinetic friction coefficient of 1st surface layer | | 0.21 | 0.16 | 0.17 | 0.15 |
| Secondary processability | | ○ | ○ | ○ | ○ |

VL-1*[6]: VLDPE-1
SVL-2*[7]: SSC-VLDPE-2
IO-1*[8]: IO-1 containing N-oleylpalmitic acid amide (0.25 wt. %) and arachidinic acid amide (0.25 wt. %)/behenic acid amide (0.25 wt. %)
SVL-1*[9]: SSC-VLDPE-1 containing erucic acid amide (0.05 wt. %)

Comparative Example 1

The procedure of Example 1 was repeated, except that no lubricant was incorporated into (EVA-1), to thereby produce a biaxially stretched film. Two weeks after production, the slidability of the film was unsatisfactory, and wrinkling occurred on a product during secondary processing. The results of evaluation of the film are shown in Table 3.

Comparative Example 2

The procedure of Comparative Example 1 was repeated, except that the amount of particle-size-regulated starch powder was changed to 180 mg/m$^2$, to thereby produce a biaxially stretched film. The slidability of the film was satisfactory, but the transparency and gloss of the film which had been wound in a roll deteriorated due to invasion of the powder into the surface of the film. The results of evaluation of the film are shown in Table 3.

Comparative Example 3

The procedure of Comparative Example 1 was repeated, except that (SSC-VLDPE-1) of Example 1 was replaced by very low density polyethylene (VLDPE-1) containing erucic acid amide (0.2 wt. %), to thereby produce a biaxially stretched film. The slidability of the film was satisfactory, but erucid amide adhered to a die lip portion during production, and thus the transparency and gloss of the film deteriorated with passage of time. The results of evaluation of the film are shown in Table 3.

TABLE 3

|  |  | Comparative Example 1 | Comparative Example 2 | Comparative Example 3 |
|---|---|---|---|---|
| Layer Structure | 1st layer (3 μm) (1st surface layer) | SVL-1*[1] | SVL-1*[1] | VL-1*[10] |
|  | 2nd layer (22 μm) | EVA-1 | EVA-1 | EVA-1 |
|  | 3rd layer (1.5 μm) | EEA | EEA | EEA |
|  | 4th layer (7 μm) | PVDC | PVDC | PVDC |
|  | 5th layer (1.5 μm) | EEA | EEA | EEA |
|  | 6th layer (15 μm) | EVA-2 | EVA-2 | EVA-2 |
|  | 7th layer (10 μm) (2nd surface layer) | IO-1 | IO-1 | IO-1 |
| Amount of particle-size-regulated starch powder sprinkled onto the outer surface (mg/m$^2$) | | 45 | 180 | 45 |
| Amount of lubricant incorporated into 2nd layer (wt. %) | | 0 | 0 | 0 |
| Amount of lubricant incorporated into the surface layer (wt. %) | | 0 | 0 | 0.2 |
| Adhesion of lubricant to die lip portion | | × | ○ | × |
| Gloss (gloss %): roll surface layer portion MD/TD | | 126/124 | 113/109 | ND |
| Thermal shrinkage percentage (MD/TD %) | | 51/52 | 50/51 | 50/52 |
| Transparency (haze %) | | 2.0 | 4.1 | ND |
| Kinetic friction coefficient of 1st surface layer | | 0.3 | 0.18 | 0.18 |
| Secondary processability | | ○ | ○ | ○ |

SVL-1*[1]: SSC-VLDPE-1
VL-1*[10]: VLDPE-1 containing erucic acid amide (0.2 wt. %)
ND: Not determined Industrial Applicability As is apparent from the above-described examples, the present invention can provide a laminated packaging material which exhibits excellent transparency and gloss. According to the present invention, operation efficiency can be maintained; for example, adhesion of a lubricant to a die lip during production of a film can be reduced, since the amount of a lubricant incorporated into an intermediate layer adjacent to a surface layer is greater than that of a lubricant incorporated into the surface layer. In addition, the slidability of the surface layer of a produced film and the extrudability of the film can be improved.

The laminated packaging material of the present invention can be used as a packaging material of foods. Particularly, the material is suitably used for packaging foods such as raw meat, ham, sausage, and a variety of edible meats. The laminated packaging material can be used in any suitable form such as bag or tube, so as to meet the intended packaging form.

What is claimed is:

1. A laminated packaging material which comprises at least three layers of polymer material comprising a surface layer, one or more intermediate layers adjacent thereto, and another surface layer, wherein the intermediate layer adjacent to each surface layer without an adhesive layer therebetween contains a lubricant, at least one of the intermediate layers has gas-barrier properties, and the total amount of any lubricant contained in both surface layers in a smaller then that contained in the intermediate layer(s) adjacent thereto without adhesive layer(s) therebetween.

2. A laminated packaging material according to claim 1, which comprises at least four layers, wherein the intermediate layers comprise an intermediate layer that is placed adjacent to a surface layer and another intermediate layer that has gas-barrier properties.

3. A laminated packaging material according to claim 2, wherein the thickness of a surface layer is smaller than that of the intermediate layer that is placed adjacent to a surface layer.

4. A laminated packaging material according to claim 2, wherein the intermediate layer that is placed adjacent to a surface layer is formed of at least one species of resin selected from the group consisting of ethylene.vinyl acetate copolymers, C1–C4 ethylene.alkyl acrylate copolymers, metallocene catalyst polyethylene having a density of less than 0.900 g/cm$^3$, ethylene.methacrylic acid copolymers, ethylene.methacrylic acid.unsaturated aliphatic carboxylic acid copolymers, and ionomers.

5. A laminated packaging material which comprises at least three layers of polymer materials comprising a surface layer, one or more intermediate layers adjacent thereto, and another surface layer, wherein the intermediate layer adjacent to each surface layers without an adhesive layer therebetween contains a lubricant and at least one of the surface layers is formed of metallcene catalyst polyethylene.

6. A laminated packaging material according to claim 5, which further comprises an intermediate layer having gas-barrier properties.

7. A laminated packaging material according to claim 1, which is heat-shrinkable.

8. A laminated packaging material according to claim 2, which is heat-shrinkable.

9. A laminated packaging material according to claim 3, which is heat-shrinkable.

10. A laminated packaging material according to claim 4, which is heat-shrinkable.

11. A laminated packaging material according to claim 5, which is heat-shrinkable.

12. A laminated packaging material according to claim 6, which is heat-shrinkable.

13. A laminated packaging material according to claim 1, wherein the intermediate layer containing lubricant comprises 0.05–5 wt. % of the lubricant based on the weight of resin in the layer.

14. A laminated packaging material according to claim 5, wherein the intermediate layer containing lubricant comprises 0.05–5 wt. % of the lubricant based on the weight of resin in the layer.

15. A laminated packaging material according to claim 1, wherein the lubricant in the intermediate layer comprises a fatty acid amide lubricant or a metallic soap.

16. A laminated packaging material according to claim 5, wherein the lubricant in the intermediate layer comprises a fatty acid amide lubricant or a metallic soap.

* * * * *

UNITED STATES PATENT AND TRADEMARK OFFICE
CERTIFICATE OF CORRECTION

PATENT NO.     : 6,592,975 B1                                              Page 1 of 1
DATED          : July 15, 2003
INVENTOR(S)    : Takahisa Yeyama et al.

It is certified that error appears in the above-identified patent and that said Letters Patent is hereby corrected as shown below:

Column 10,
Line 8, change "layers" to -- layer --.
Line 10, change "metallcene" to -- metallocene --.

Signed and Sealed this

Fourteenth Day of October, 2003

JAMES E. ROGAN
*Director of the United States Patent and Trademark Office*